Oct. 29, 1940.  H. N. SCHWARZKOPF  2,219,850
SOUND PICTURE APPARATUS
Filed March 28, 1936   4 Sheets-Sheet 1
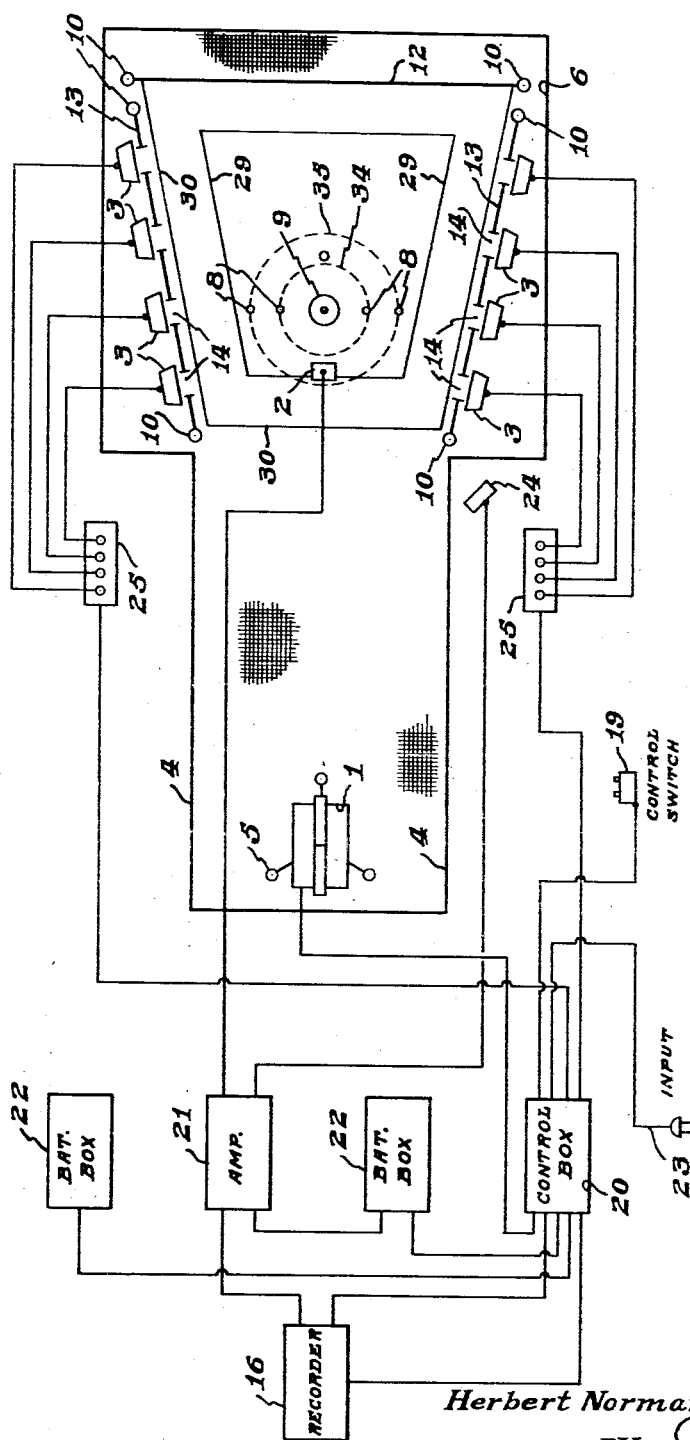
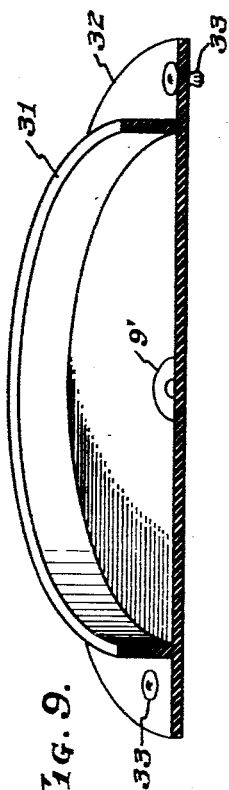
INVENTOR
Herbert Norman Schwarzkopf
BY
ATTORNEY Oct. 29, 1940.　　　H. N. SCHWARZKOPF　　　2,219,850
SOUND PICTURE APPARATUS
Filed March 28, 1936　　　4 Sheets-Sheet 2
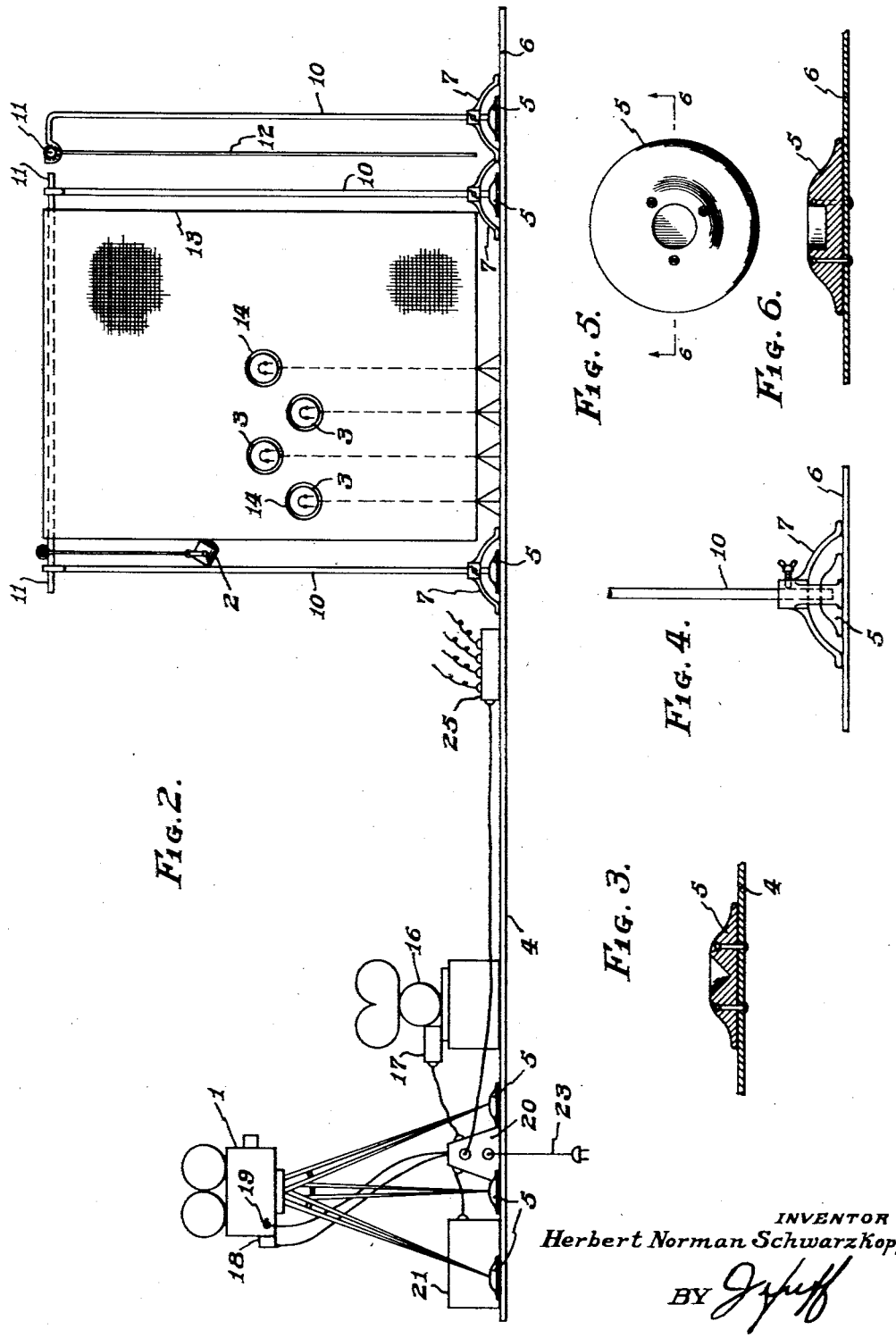
INVENTOR
Herbert Norman Schwarzkopf
BY
ATTORNEY Oct. 29, 1940.  H. N. SCHWARZKOPF  2,219,850
SOUND PICTURE APPARATUS
Filed March 28, 1936  4 Sheets-Sheet 3

INVENTOR
Herbert Norman Schwarzkopf
BY
ATTORNEY

Oct. 29, 1940.    H. N. SCHWARZKOPF    2,219,850
SOUND PICTURE APPARATUS
Filed March 28, 1936    4 Sheets-Sheet 4

Inventor
*Herbert Norman Schwarzkopf*
By
Attorney

Patented Oct. 29, 1940

2,219,850

UNITED STATES PATENT OFFICE 2,219,850

SOUND PICTURE APPARATUS

Herbert Norman Schwarzkopf, Lawrenceville, N. J., assignor to Radio Corporation of America, a corporation of Delaware Application March 28, 1936, Serial No. 71,368

2 Claims. (Cl. 35—21)

This invention relates to apparatus for use in the identification of persons or for producing records of their mannerisms and voices for future reference. The invention is of particular use in connection with the identification of criminals and as a supplement to various other methods of identification such as finger prints, the Bertillon system and so forth although it is of use under any circumstances where a permanent record of the appearance, voice and mannerisms of a person are to be preserved. The invention further provides an apparatus whereby such records are always taken under similar circumstances and in a similar manner so that the records are available for comparison with records taken at other times or places or by other operators even though the operators be comparatively unfamiliar with the apparatus.

Since the records are always taken in a similar manner and with the subject executing predetermined motions, a direct comparison of different records of the same person or different persons can be made.

Figure 8:
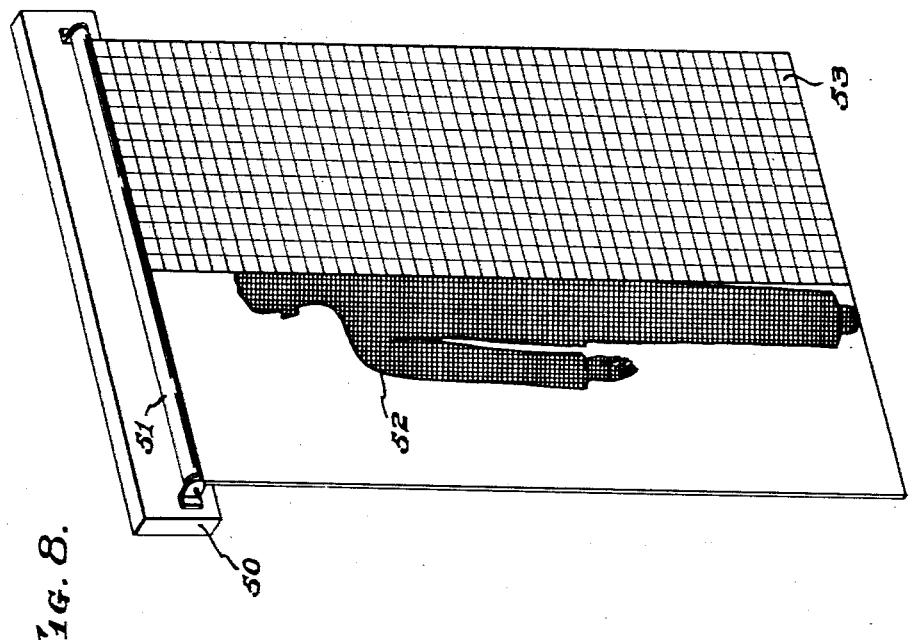
Figure 7:
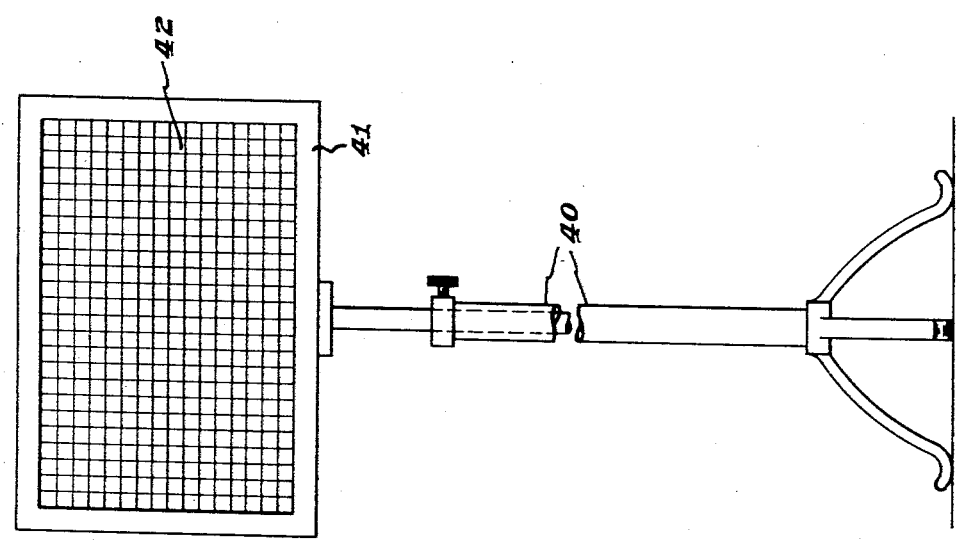
Figure 10:
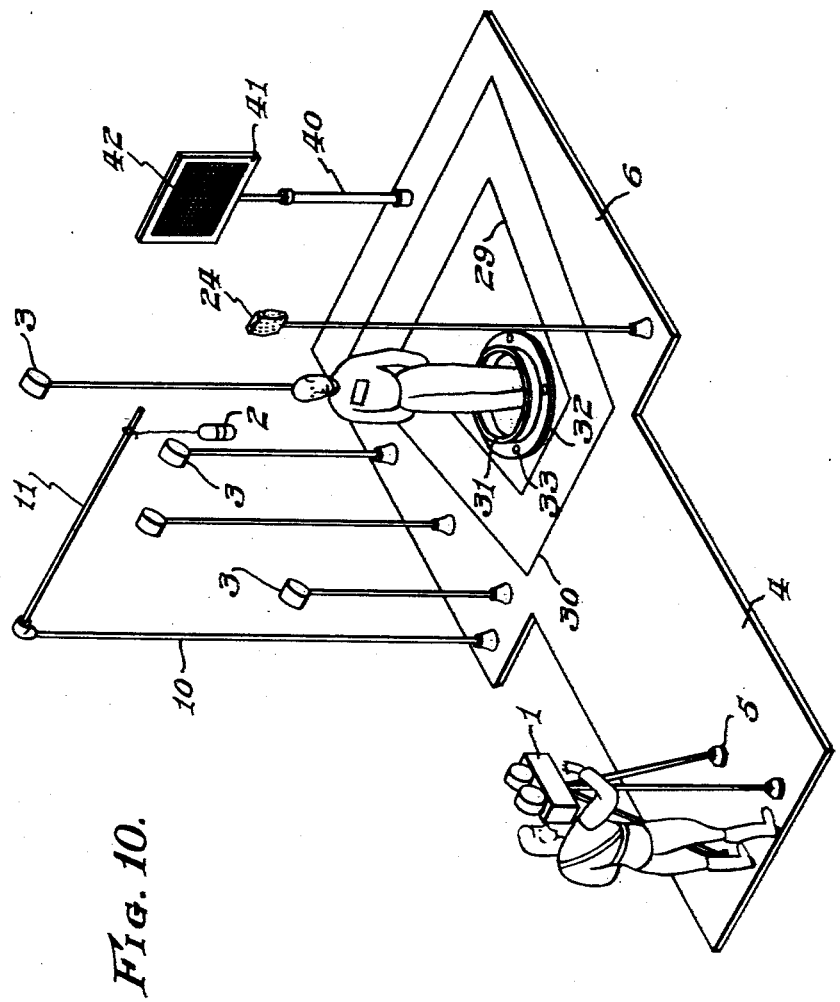

One object of my invention is to provide an apparatus for identification of persons;

Another object of my invention is to provide a removable floor covering which can be readily transported from place to place for association in a predetermined manner with other apparatus;

Another object of my invention is to provide an apparatus which will assist in the recording of the typical mannerisms of motion and speech of the person to be identified;

Other and ancillary objects of my invention will be apparent to those skilled in the art from a reading of the following specification and an inspection of the accompanying drawings in which, Fig. 1 is a schematic plan view of the apparatus showing schematically the arrangement of apparatus elements, Fig. 2 is an elevation partly in section, Figs. 3, 4, 5 and 6 are details, Figs. 7 and 8 show accessories, Fig. 9 shows an attachment for the mat, and Fig. 10 is a perspective view showing the mat and its attachments in assembled relation, but omitting the side walls and back drop.

The same reference numerals are used in all figures for similar parts.

In this apparatus as shown in the drawings I provide a motion picture camera 1 which is adapted to photograph the person or persons. Between the camera and the place where the person is to be photographed there is located a microphone 2 appropriately held in position preferably by a suspension as shown. Photographic lights 3 are appropriately located in relation to the field of the lens of the camera to illuminate the person.

In order to conveniently predetermine the relative positions of the apparatus and the subject I provide a mat consisting of two integral portions, a portion 4 which carries fixtures 5 for receiving the feet of the tripod thereby predetermining the camera position and a portion 6 which is provided with other fixtures 5 for determining the position of the supporting framework of the apparatus and which is also provided with indicia 8 showing the field of view of various lenses and with further indicia 9 indicating the positions and/or path of the subject during the course of the photography.

The circle 9 indicates the point of most effective focus of the camera and the most satisfactory operation of the microphone and, during questioning, the subject is preferably located at that point.

The supporting poles 10 which are fixed in position by the fixtures 7 support the rods 11 from which depend the back drop 12 and the side curtains 13. These side curtains are provided with apertures in the proper location as indicated at 14 through which light is projected from the photographic lights 3. It will be apparent that the position of the lights is determined by the position of the apertures, while the back drop provides an appropriate background for the photography. These side walls and the back drop, as well as the floor, are preferably painted a light gray so as to avoid extreme reflections or extreme shadows.

The mat as well as the back drop and side walls are preferably made of canvas or some equivalent material so that they can be readily rolled and transported.

A sound recorder, preferably of the sound on film type, is provided as shown at 16 and this is driven by a synchronous motor 17 which is interconnected with the synchronous motor 18 driving the picture camera.

Any appropriate marking mechanism is provided on both the camera and sound recorder for indicating points of synchronism between the two records.

At the camera there is provided a control switch 19 which controls all the circuits of the apparatus. This control switch is connected to a control box 20 containing the appropriate relays and interconnecting switches. Sound from the microphone 2 is transmitted to the amplifier indicated at 21 which is any thermionic amplifier of usual type and from which the output is transmitted to the recorder 16. Appropriate battery boxes for the actuation of the amplifier are provided as indicated at 22 and are connected through the control box. A power lead 23 is provided which is adapted to be plugged into any commercial power supply and from this power supply current is secured for operating the photographic lights and for driving the camera and recorder motors.

When the switch 19 is closed the relays in the control box turn on the various portions of the apparatus in proper sequence to provide minimum loss of time, current and film. For example, the amplifier filaments may be first turned on followed after a few seconds by the photographic lights and the plate current for the amplifier and then, after a few seconds allowed for the subject to regain his composure, the camera and recorder motors may be started.

It is important, of course, that the sound recorder and its accessory equipment be of high quality in order that the subject's voice may be reproduced as naturally as possible.

An additional microphone 24 is provided for the use of the person interviewing the subject, and this microphone is placed in any convenient location.

Junction boxes 25 are provided for convenient connection of the photographic lights to the control box.

Fig. 3 shows the form of the fixtures 5 which are used to locate the feet of the tripod.

The fixtures used to locate the framework of the side walls and back drop are shown in plan and section respectively in Figs. 5 and 6 and the manner in which the supporting poles cooperate with these fixtures is shown in Fig. 4. As shown in this latter figure, the poles 10 pass through the base 7 into the aperture in the appropriate fixtures 5.

When the apparatus is operating the subject is caused to walk about or stand in particular positions, moving from one position to another in the field of the camera in order that his manner of movement may be observed and photographed; and he is also caused to speak preferably using predetermined phrases serving to particularly accent his peculiarities of speech. The movements which the subject is caused to perform are preferably such as to provide view of him from all directions.

The subject may be caused to walk along a path such as that defined by the lines 29 and 30 in the field of the camera in order that he may appear in all positions within the field, this path being indicated by appropriate marks painted on the mat 6.

When using long focus lenses for close-up views it is necessary that the subject stay within the field of the lens and I, accordingly, provide appropriate means to prevent the subject from walking out of the field. For example, I may use a rubber ring 31 as shown in Fig. 9 which is of such height as to contact with the subject's feet if he moves too far. This ring is provided with a base as indicated at 32 which may be formed from the same piece of rubber and the base is provided with snap-fasteners 33 adapted to cooperate with corresponding members in the mat 6 which serve to predetermine its position. It will be apparent that the ring 31 may be made of any desired material such as wood or metal. Several of these rings may be provided corresponding in diameter with the field of the several lenses to be used as indicated in dotted lines at 34 and 35 in Fig. 1.

In use of my apparatus in preserving identification records it is desirable to provide accurate measurements of the subject and this is accomplished by the apparatus shown in Figs. 7 and 8. As shown in Fig. 7 I provide a stand 40 of any appropriate type which supports a frame 41 which may be a plain wooden frame provided with apertures through which are strung the wires 42 at right angles to each other and at uniform intervals. At an appropriate stage of the photography and preferably when using a long focus lens this screen is placed in front of the subject's face in order that the dimensions and proportions thereof may be readily ascertained from the photograph. On a similar stand 40 I provide a cross member 50 as shown in Fig. 8 carrying a roller curtain 51 of appropriate texture and preferably of the same shade of gray as the back drop and the walls of the apparatus. On this curtain there is depicted a half silhouette of an average person as indicated at 52 and on the other half of the screen there is an appropriately ruled chart 53 which may be any desired style but is preferably of the type customarily used in the identification charts of the Bertillon type. This curtain is pulled down behind the subject during some stage of the photography when a full length picture is being taken and from a comparison with the silhouette and the chart the subject's comparison with an average person and his exact measurements may be determined. It will be apparent to those skilled in the art that instead of using the screen of Fig. 7 and the chart of Fig. 8 corresponding transparent masks can be used, and these may either be inserted into the camera adjacent to the film or inserted in the printer during the printing operation; all these serving the same purpose of impressing on the film the exact physical characteristics of the person at the same time that the picture and sound record are being produced.

Since the movements and speech are predetermined the length of time occupied by these movements is substantially uniform and a uniform amount of film will be used in the photographing of each subject.

The finished negative and sound negative may be printed as a single film, as is customary in motion picture photography and may also be reduced to a smaller size as, for example, 16 mm.

The foregoing apparatus is of particular value in connection with the apprehension of criminals who have been previously recorded by this apparatus, as a large number of prints of the photograph may be distributed over a large area where they could be viewed by all the proper officials who would then be enabled to recognize the criminal by his voice and mannerisms even if his physical appearance were considerably altered.

It will be apparent to those skilled in the art that my invention is not limited to the use of the specific apparatus and accessories shown in the drawings, as other types of cameras, sound recording apparatus, lighting equipment, etc., may be used in combination with the specific type of mat disclosed. For example, instead of the chart shown in Fig. 8, I may choose to use a chart having a rectangular middle area laid off in rectangles according to the Bertillon system, with a figure to the left thereof of half the silhouette of a man facing front, a figure to the right of half the silhouette of a man facing left. In the use of this chart, a subject facing front shows his measurements and comparison with the silhouette to the left, while a subject facing left shows his measurements and comparison with the silhouette at the right.

Having now described my invention, I claim:

1. Apparatus of the class described comprising a removable flexible floor covering, sockets on said covering for fixing the position of a camera, other sockets on said covering for fixing the position of microphone supports, and other sockets on said covering for fixing the position of a graduated screen in alignment with said camera.

2. Apparatus of the class described comprising a removable flexible floor covering, sockets on said covering for fixing the position of a camera, other sockets on said covering for fixing the position of microphone supports, other sockets on said covering for fixing the position of a graduated screen in alignment with said camera, and fasteners on said covering for securing means for limiting the path of movement of a person in the field of the camera.

HERBERT NORMAN SCHWARZKOPF.